United States Patent
Ganu et al.

(10) Patent No.: US 12,101,638 B2
(45) Date of Patent: Sep. 24, 2024

(54) CHANNEL ASSIGNMENTS FOR RANGING BETWEEN ACCESS POINTS DURING BEACON INTERVALS

(71) Applicant: HEWLETT PACKARD ENTERPRISE DEVELOPMENT LP, Houston, TX (US)

(72) Inventors: Sachin Ganu, San Jose, CA (US); Vikram Raghu, Santa Clara, CA (US); Omar El Ferkouss, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 412 days.

(21) Appl. No.: 17/691,332

(22) Filed: Mar. 10, 2022

(65) Prior Publication Data

US 2023/0292134 A1  Sep. 14, 2023

(51) Int. Cl.
*H04W 64/00* (2009.01)
*H04W 16/10* (2009.01)
*H04W 24/10* (2009.01)
*H04W 72/0453* (2023.01)
(Continued)

(52) U.S. Cl.
CPC ........... *H04W 16/10* (2013.01); *H04W 24/10* (2013.01); *H04W 64/003* (2013.01); *H04W 72/0453* (2013.01); *H04W 72/542* (2023.01); *H04W 84/12* (2013.01)

(58) Field of Classification Search
CPC ... H04W 16/10; H04W 24/10; H04W 64/003; H04W 72/0453; H04W 72/542; H04W 84/12
See application file for complete search history.

(56) References Cited

U.S. PATENT DOCUMENTS 7,633,994 B2  12/2009  Forenza et al.
7,729,325 B2  6/2010  Gopalakrishnan et al.
(Continued)

FOREIGN PATENT DOCUMENTS

CN  101064963 A  * 10/2007 ............ H04W 64/00
CN  114007237 A  *  2/2022

*Primary Examiner* — Sithu Ko
*Assistant Examiner* — Malick A Sohrab
(74) *Attorney, Agent, or Firm* — Hewlett Packard Enterprise Patent Department

(57) ABSTRACT

Examples described herein provide channel assignments for ranging between network devices in a network during beacon intervals. Examples described herein may assign a plurality of channels to a plurality of network devices based on a plurality of channel assignment permutations, and initiate, during beacon intervals, ranging measurements between the plurality of network devices on the plurality of channels based on each of the channel assignment permutations to generate ranging results. Examples described herein may determine whether total ranging measurements are performed for a threshold percentage of available links between the plurality of network devices on the plurality of channels, wherein the total ranging measurements include the ranging measurements based on each of the channel assignment permutations. Examples described herein may, based on a determination that the total ranging measurements are performed for the threshold percentage of available links, resolve locations of the plurality of APs based on the ranging results.

20 Claims, 6 Drawing Sheets

(51) Int. Cl.
*H04W 72/542* (2023.01)
*H04W 84/12* (2009.01)

(56) References Cited

U.S. PATENT DOCUMENTS

| | | | |
|---|---|---|---|
| 8,125,970 B2 * | 2/2012 | Gu | H04W 64/00 370/338 |
| 8,160,121 B2 | 4/2012 | Forenza et al. | |
| 8,170,081 B2 | 5/2012 | Forenza et al. | |
| 8,571,086 B2 | 10/2013 | Forenza et al. | |
| 9,819,403 B2 | 11/2017 | Forenza et al. | |
| 9,826,537 B2 | 11/2017 | Forenza et al. | |
| 10,200,094 B2 | 2/2019 | Forenza et al. | |
| 11,737,048 B2 * | 8/2023 | Sheriff | H04W 64/003 455/456.1 |
| 2015/0029945 A1 * | 1/2015 | Do | H04W 64/00 370/329 |
| 2015/0304855 A1 | 10/2015 | Perlman et al. | |
| 2016/0057186 A1 * | 2/2016 | Jose | H04W 64/00 370/312 |
| 2018/0097550 A1 | 3/2018 | Perlman et al. | |
| 2018/0310133 A1 * | 10/2018 | Ramasamy | H04W 64/003 |

\* cited by examiner

CHANNEL ASSIGNMENTS FOR RANGING BETWEEN ACCESS POINTS DURING BEACON INTERVALS

CROSS-REFERENCE TO RELATED APPLICATIONS

This application is related to a co-pending U.S. application titled "COORDINATED RANGING BETWEEN ACCESS POINTS IN A NETWORK," filed on Dec. 2, 2021 (U.S. application Ser. No. 17/541,909), which has Patent ID Number 710230473US01 and is assigned to Hewlett Packard Enterprise Development LP, and is related to a co-pending U.S. application titled "RANGING BY A NETWORK DEVICE DURING A BEACON INTERVAL," filed on Dec. 2, 2021 (U.S. application Ser. No. 17/541,872), which has Patent ID Number 710230473US02 and is assigned to Hewlett Packard Enterprise Development LP.

BACKGROUND

Generally, in a Wireless Local Area Network (WLAN), one or more Access Points (APs) may be deployed. Communication devices such as laptops, personal computers, smartphones, etc. may connect to the WLAN to exchange data within the network. The communication devices can raise ranging requests with the one or more APs.

Ranging techniques such as the Fine Timing Measurement (FTM) protocol have attained prominence due to wide compatibility between the APs and the communication devices. The FTM protocol, typically, comprises exchange of messages between the APs and the communication devices. From the messages, a time of flight, a round trip time, etc. is derived, which is used for determining a position of the communication device with reference to the AP. For example, the time of flight (ToF) can be defined as the overall time taken by signals to propagate from the AP to a client device (say, the communication device), and back to the AP from the client device. From the time of flight information, a distance between the AP and the client device may be determined.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
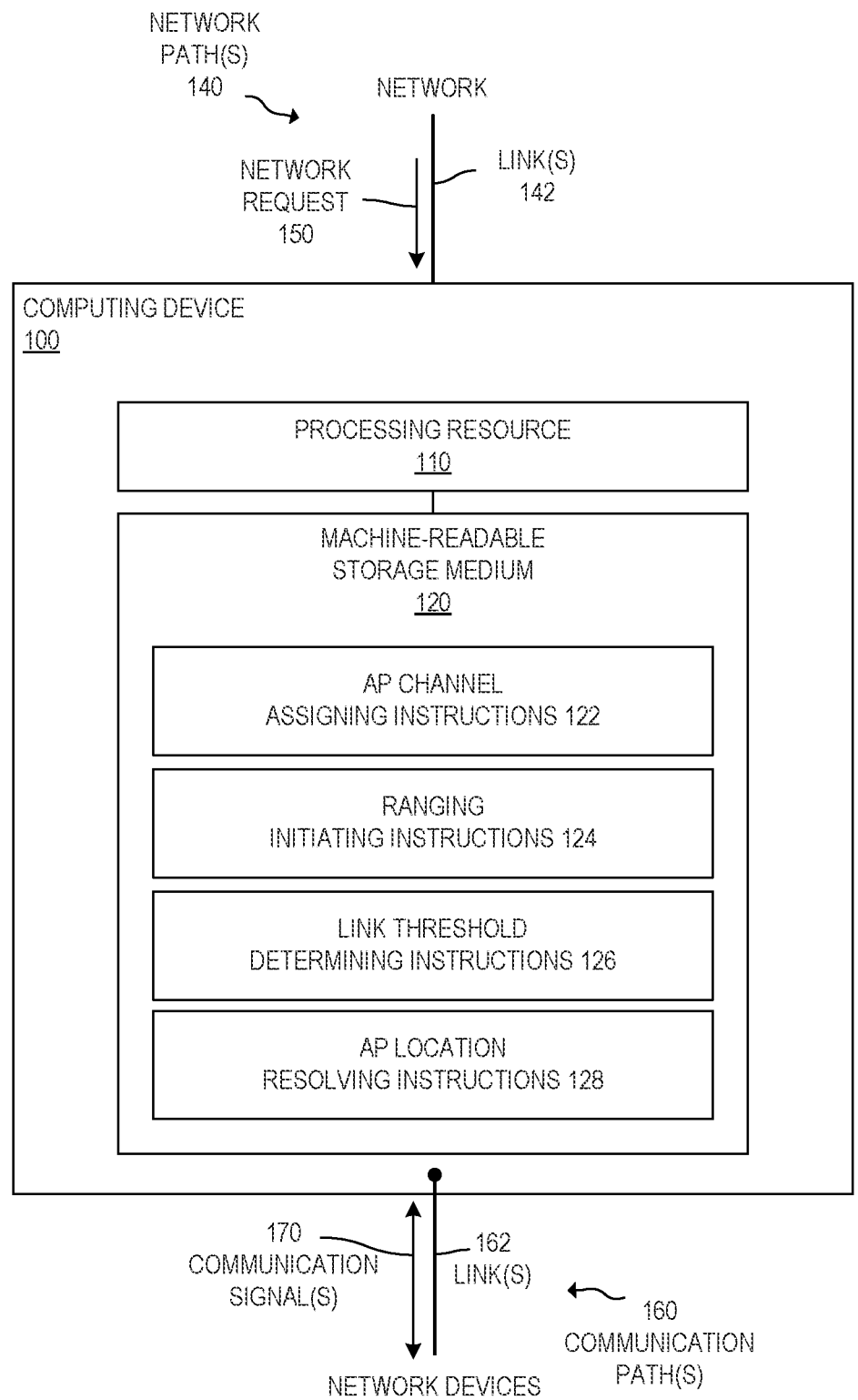
FIG. 1 is a block diagram of an example computing device for providing channel assignments for ranging between APs in a network during beacon intervals.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Recently, there have been efforts to automatically locate APs in a network, for instance, on a visual floor plan of the network. Such automatic location of APs is advantageous over the manual location of APs, as the manual location of APs can be an error-prone process. For instance, when manually locating APs in a network, an AP's location may be incorrectly measured or entered, or an AP may be moved or removed from service.

To support the automatic location of APs, the APs need to perform packet exchanges with neighboring APs, and then measure the round trip time (RTT) of these packet exchanges to estimate the range of the APs to their corresponding neighbor APs. Performing ranging sequentially between individual pairs of APs may result in increased airtime overhead since a larger amount of available airtime is used to complete the ranging measurements between the APs (e.g., as compared to simultaneous or parallel ranging.) Moreover, ranging techniques typically do not allow APs to continue performing ranging when there are changes to a network's topology (e.g., when APs are added to the network or removed from service) without causing disruptions to communications between the APs and client devices that are connected to the APs. To address one or more of these issues, techniques for providing ranging by a network device during a beacon interval and for providing coordinated ranging between APs in a network are described further in U.S. application Ser. Nos. 17/541,909 and 17/541,872, which are hereby incorporated by reference.

However, it may not always be feasible to provide coordinated ranging between APs in a network. For example, it may not be feasible to initiate ranging measurements between APs in a network on a given channel (e.g., first channel, second channel) while the APs are communicating with stations (e.g., client devices) in the network, and when there is no downtime in such communications between the APs and the stations. Moreover, in some instances, when a network device performs ranging with an AP during a beacon interval (e.g., when the network device initiates ranging measurements with the AP during an off-channel dwell period when the network device is not communicating with a station), ranging measurements initiated by the network device may not account for multiple available channel assignments for each AP to perform the ranging measurements. Furthermore, as described herein, it was discovered that performing ranging between pairs of APs while using multiple available channels for each AP may increase the accuracy of such ranging.

To address these issues, examples described herein provide channel assignments for ranging between network devices (e.g., APs) in a network during beacon intervals. Examples described herein may assign, by a computing device, a plurality of channels to a plurality of network devices based on a plurality of channel assignment permutations, and initiate, by the computing device during beacon intervals, ranging measurements between the plurality of network devices on the plurality of channels based on each of the channel assignment permutations to generate ranging results. Examples described herein may determine, by the computing device, whether total ranging measurements are performed for a threshold percentage of available links between the plurality of network devices on the plurality of channels, wherein the total ranging measurements include the ranging measurements based on each of the channel assignment permutations. Examples described herein may, based on a determination that the total ranging measurements are performed for the threshold percentage of available links, resolve, by the computing device, locations of the plurality of APs based on the ranging results.

Examples described herein may assign, by a computing device, a plurality of channels to a plurality of APs based on a channel assignment permutation, and initiate, by the computing device during beacon intervals, ranging measurements between the plurality of APs on the plurality of channels based on the channel assignment permutation to generate a ranging result. Examples described herein may determine, by the computing device, whether total ranging measurements are performed for a threshold percentage of available links between the plurality of APs on the plurality of channels, wherein the total ranging measurements include the ranging measurements. Based on a determination that the total ranging measurements are not performed for the threshold percentage of available links between the plurality of APs on the plurality of channels, examples described herein may assign, by the computing device, the plurality of APs to the plurality of channels according to another channel assignment permutation (e.g., second channel assignment permutation) and initiate, by the computing device during subsequent beacon intervals (e.g., second beacon intervals), additional ranging measurements (e.g., second ranging measurements) between the plurality of APs on the plurality of channels based on the other channel assignment permutation to generate another ranging result (e.g., second ranging result). Examples described herein may, based on a determination that the total ranging measurements are performed for the threshold percentage of available links, resolve, by the computing device, locations of the plurality of APs based on each ranging result of each channel assignment permutation.

In this manner, examples described herein may provide multiple channel assignments for ranging between network devices (e.g., APs) in a network during beacon intervals, thereby increasing the accuracy of ranging between the APs. For instance, examples described herein may determine, by the computing device, whether total ranging measurements are performed for a threshold percentage of available links between the APs on the plurality of channels, thereby ensuring that the ranging measurements performed between the APs utilize multiple available channel assignments for each AP. Moreover, examples described herein may, based on a determination that the total ranging measurements are performed for the threshold percentage of available links, resolve, by the computing device, locations of the plurality of APs based on each ranging result of each of the channel assignment permutations, thus performing ranging measurements between the APs which utilize multiple available channel assignments for each AP, and thereby performing ranging measurements with a diversity of channels and increasing the accuracy of ranging between the APs.

Computing Device

Referring now to the drawings, FIG. 1 depicts a block diagram of an example computing device 100 for providing channel assignments for ranging between network devices (e.g., APs) in a network during beacon intervals. Computing device 100 includes at least one processing resource 110 and at least one machine-readable storage medium 120 comprising (e.g., encoded with) at least AP channel assigning instructions 122, ranging initiating instructions 124, link threshold determining instructions 126, and AP location resolving instructions 128.

In the example of FIG. 1, computing device 100 may include a device to communicate with a plurality of network devices in a network to provide channel assignments for ranging between the network devices during beacon intervals. For instance, computing device 100 may comprise a gateway router, a wireless local area network (WLAN) controller, a switch, a server, or a combination thereof. In some examples, computing device 100 may comprise an AP that is configured to communicate with the plurality of network devices in the network.

In the example of FIG. 1, computing device 100 may engage in any network data transmission operations, including, but not limited to, switching, routing, bridging, or a combination thereof. Moreover, computing device 100 may gather network operating information from various nodes of one or more networks, including network traffic load information, network topology information, network usage information, etc. Furthermore, computing device 100 may transmit commands to various nodes of the one or more networks to alter network topology and routing to achieve various network efficiency and efficacy goals. It will be understood that computing device 100 may comprise any suitable type(s) of computing device(s) configured to provide channel assignments for ranging between network devices in a network. Moreover, computing device 100 may include any necessary hardware components to perform the inventions disclosed herein, including, but not limited to: processors, memories, display devices, input devices, communications equipment, etc.

In the example of FIG. 1, computing device 100 may be configured (e.g., encoded with instructions executable by at least one processing resource 110) to receive network request(s) 150 from a network via network path(s) 140. Network path(s) 140 may include any suitable link(s) 142 (e.g., wired or wireless, direct or indirect, etc.) between computing device 100 and a network. Network request(s) 150 may include any suitable instructions to instruct computing device 100 to provide channel assignments for ranging between network devices in a network. For instance, network request(s) 150 may include instructions to instruct computing device 100 to perform AP channel assigning instructions 122, ranging initiating instructions 124, link threshold determining instructions 126, and AP location resolving instructions 128.

In examples described herein, a "network path" may include a combination of hardware (e.g., interfaces, links, etc.) and instructions (e.g., executable by a processing resource) to communicate (e.g., receive, send) a command (e.g., network request 150) to an external resource (e.g., server, cloud computing resource, etc.) connected to the network.

In the example of FIG. 1, computing device 100 may be configured (e.g., encoded with instructions executable by at least one processing resource 110) to send or receive communication signal(s) 170 via communication path(s) 160 to perform ranging between the network devices in a network during beacon intervals. Communication path(s) 160 may include any suitable link(s) 162 (e.g., wired or wireless, direct or indirect, etc.) between computing device 100 and one or more network devices. Communication signal(s) 170 may include any suitable instructions for computing device 100 to provide channel assignments for performing ranging between the network devices in the network (e.g., to perform AP channel assigning instructions 122, ranging initiating instructions 124, link threshold determining instructions 126, and AP location resolving instructions 128).

In examples described herein, a "communication path" may include a combination of hardware (e.g., interfaces, links, etc.) and instructions (e.g., executable by a processing resource) to communicate with (e.g., receive a command or send a command to) one or more network devices.

Cumulative Distribution of FTM Ranging Errors Between APs on Multiple Channels

Figure 3:
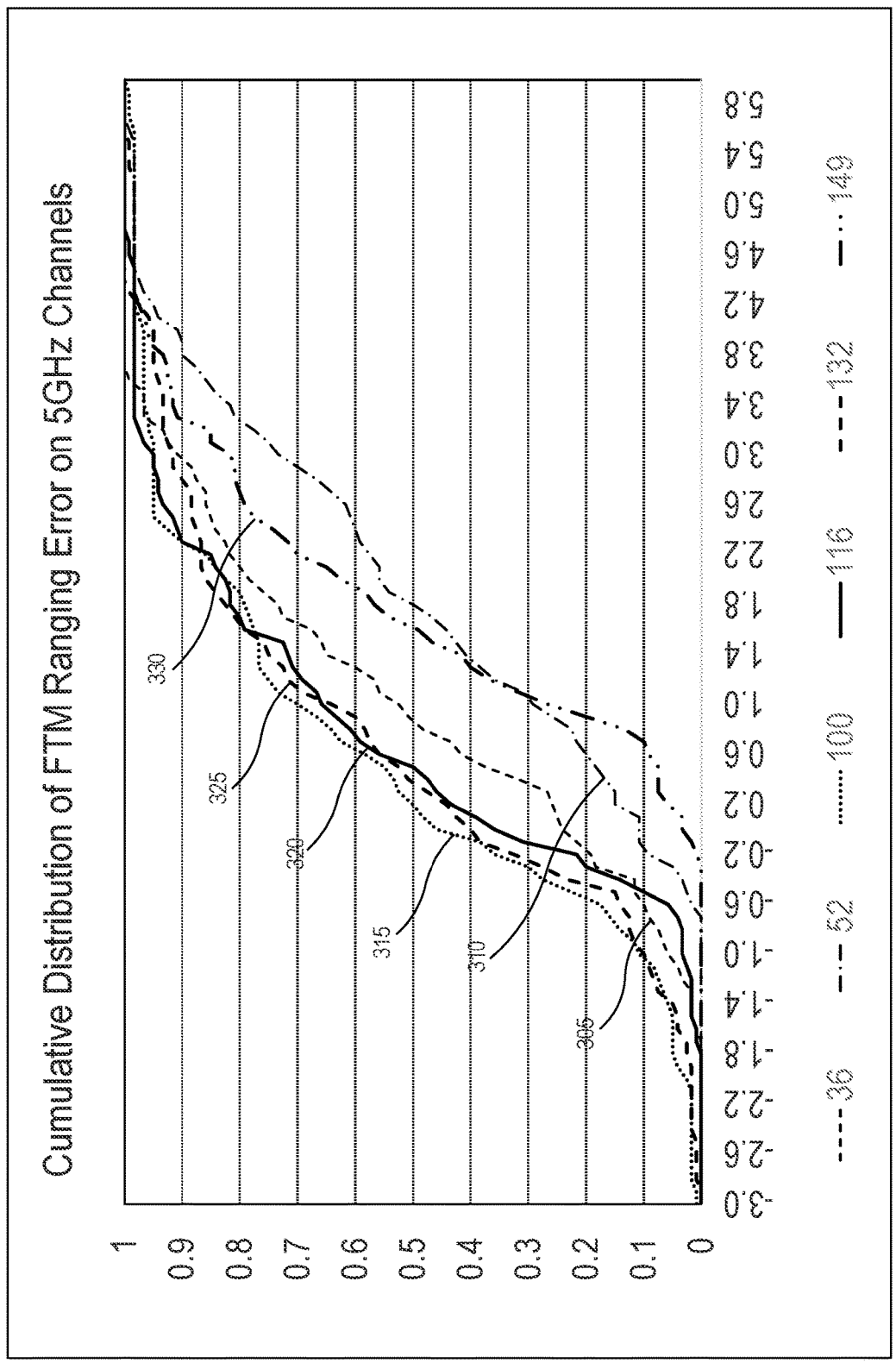
FIG. 3 is a graph which shows a cumulative distribution of FTM ranging error between two APs on multiple 5 GHz channels.

FIG. 3 is a graph 300 which shows a cumulative distribution function (CDF) plot of FTM ranging error between pairs of network devices (APs) on different channels in the 5 GHz band. As shown in FIG. 3, the CDF plot shows a probability (represented as a value between 0 and 1) that an error in an estimated distance (range) between pairs of APs of the plurality of APs will have a value less than a given distance (in meters.) The CDF plot shown in FIG. 3 was obtained by performing pairwise FTM ranging between pairs of 26 Aruba® AP-505 network devices (APs) on multiple channels. The 26 APs were deployed across a floor of a building. Specifically, the results of FIG. 3 were obtained by performing pairwise FTM ranging between pairs of the 26 APs on six channels, channels 36, 52, 100, 116, 132, and 149, according to the IEEE 802.11 protocol for the 5 GHz band.

As shown in FIG. 3, curve 305 represents a cumulative distribution of FTM ranging error between pairs of the APs on channel 36, curve 310 represents a cumulative distribution of FTM ranging error between pairs of the APs on channel 52, curve 315 represents a cumulative distribution of FTM ranging error between pairs of the APs on channel 100, curve 320 represents a cumulative distribution of FTM ranging error between pairs of the APs on channel 116, curve 325 represents a cumulative distribution of FTM ranging error between pairs of the APs on channel 132, and curve 330 represents a cumulative distribution of FTM ranging error between pairs of the APs on channel 149. As shown in FIG. 3, it was discovered that the cumulative distribution of FTM ranging error between pairs of the APs on certain channels had a mean value closer to 0 meters (and thus corresponded to more accurate FTM ranging results) as compared to other channels. For example, as shown in FIG. 3, the cumulative distribution of FTM ranging error between pairs of the APs on channel 116 (shown as curve 320) had a mean closer to 0 meters as compared to the cumulative distribution of FTM ranging error between pairs of the APs on channel 132 (shown as curve 325.) Thus, it was discovered that performing ranging between pairs of the APs on multiple available channels may provide different ranging results, and thereby allows selection of ranging results on an available channel (or on multiple available channels) with a more favorable cumulative distribution of ranging error (e.g., with a mean value closer to 0 meters) as compared to one or more other available channels.

Channel Assignments for Ranging Between APs During Beacon Intervals

Figure 4:
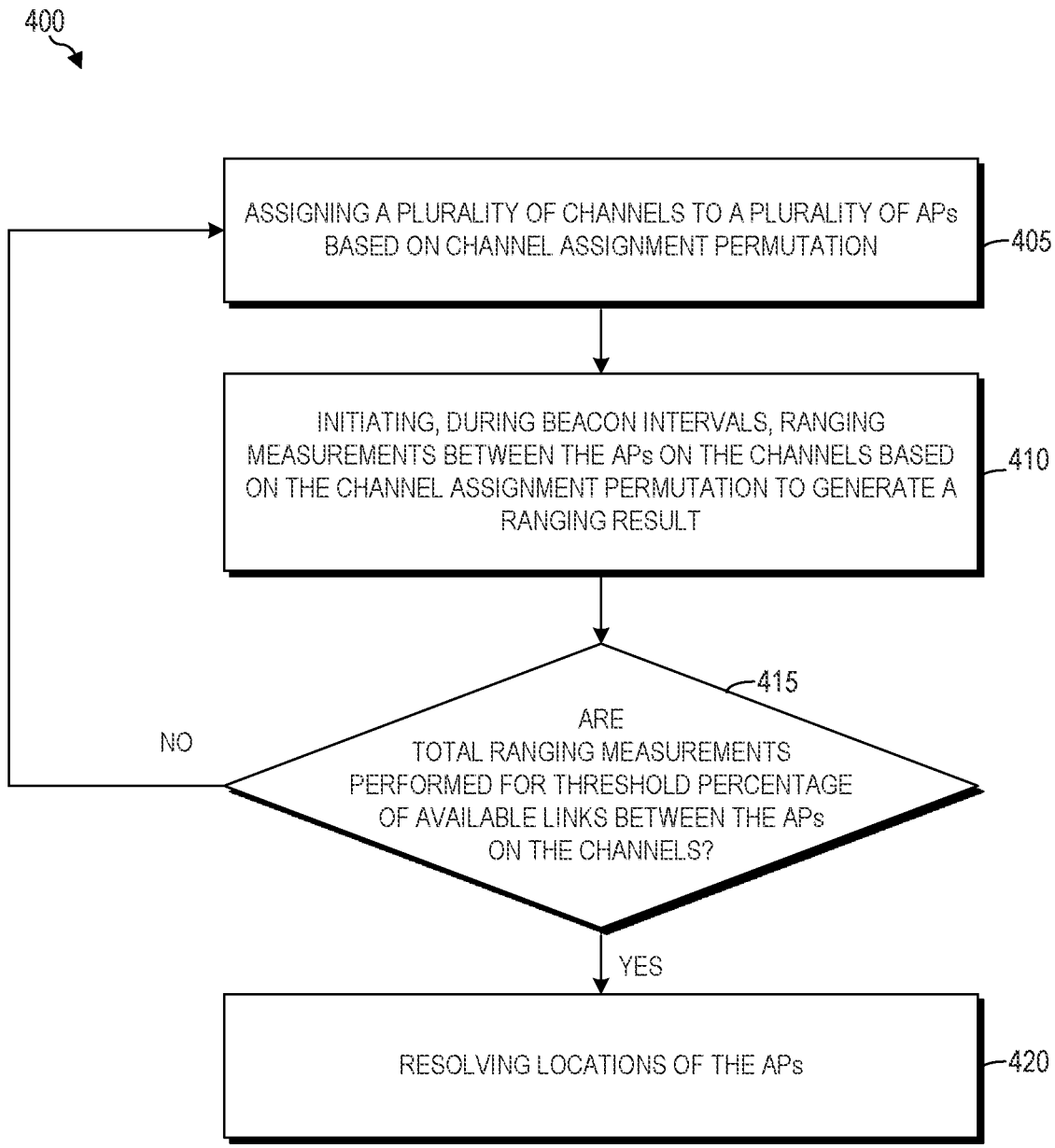
FIG. 4 is a flowchart of an example method for providing channel assignments for ranging between APs in a network during beacon intervals.

Referring to FIG. 4, a flowchart depicting a method 400 for providing channel assignments for ranging between APs in a network during beacon intervals is presented in some examples. Although the execution of method 400 is described below with reference to computing device 100 of FIG. 1, any suitable computing device for the execution of method 400 may be utilized. Additionally, the implementation of method 400 is not limited to such examples. While method blocks 405 to 420 are shown in method 400, method 400 may include other actions described herein. Additionally, although the blocks are shown in an order, blocks depicted in FIG. 4 may be performed in any suitable order and at any time. Moreover, one or more of blocks of method 400 may be performed in combination with one or more blocks of method 500. Also, some of the blocks shown in method 400 may be omitted without departing from the spirit and scope of this disclosure.

At block 405, method 400 may include assigning a plurality of channels to a plurality of APs in a network based on a channel assignment permutation.

The channel assignment permutation may be selected from a set of available channel assignment permutations for the plurality of APs. For each channel assignment permutation in the set of channel assignment permutations, one or more APs of the plurality of APs may be assigned a different channel as one or more other APs of the plurality of APs. In addition, for each channel assignment permutation in the set of channel assignment permutations, one or more APs of the plurality of APs may be assigned to a same channel as one or more other APs of the plurality of APs. For each channel assignment permutation, the plurality of channels may be in any suitable frequency range(s). For instance, each channel assignment permutation may include a plurality of channels in the 2.4 GHz band or 5 GHz band. The plurality of channels in each channel assignment permutation may conform with any suitable wireless communications standards (e.g., IEEE 802.11.) The plurality of channels for each channel assignment permutation may be determined based on the capabilities of each of the plurality of APs (e.g., based on the capabilities of the plurality of APs to communicate in the 2.4 GHz band, 5 GHz band, etc.)

In addition, the channel assignment permutation may be determined by computing device 100 or may be received by computing device 100 from an external source (e.g., from a user input, server, cloud resource, etc.) that communicates with computing device 100 via a network. The channel assignment permutation may assign a plurality of available channels to the plurality of APs to minimize interference between the APs during simultaneous communications by the APs on the plurality of channels (e.g., simultaneous communications by the APs with client devices connected to the one or more APs on the plurality of channels, simultaneous communications by one or more APs with one or more other APs on the plurality of channels, etc.) The channel assignment permutation may be part of a channel assignment plan that is determined by computing device 100 or received by computing device 100 from an external source (e.g., from a user input, server, cloud resource, etc.)

At block 410, method 400 may include initiating, during beacon intervals, ranging measurements between the plurality of APs on the plurality of channels based on the channel assignment permutation to generate a ranging result (e.g., a first ranging result.)

Initiating ranging measurements between the plurality of APs on the plurality of channels to generate a ranging result may include initiating, during a beacon interval (e.g., first beacon interval), ranging measurements between two APs of the plurality of APs on a first channel, wherein the first channel is assigned to one of the two APs (i.e., a first AP) based on the channel assignment permutation. In addition, initiating ranging measurements between the plurality of APs on the plurality of channels may comprise initiating, during another beacon interval (e.g., second beacon interval), ranging measurements between the two APs on a second channel, wherein the second channel is assigned to the other one of the two APs (i.e., a second AP) based on the channel assignment permutation. Thus, initiating ranging measurements between the plurality of APs on the plurality of channels based on a channel assignment permutation may include pairwise ranging measurements between each pair of APs on each of the two channels assigned to the pair of APs.

The ranging measurements between the plurality of APs on the plurality of channels may be initiated for all APs of the plurality of APs. For instance, ranging between the plurality of APs on the plurality of channels may include initiating, for each pair of APs of the plurality of APs, ranging measurements between the pair of APs on the assigned channel(s) to the pair of APs based on the channel assignment permutation. Alternatively, the ranging measurements between the plurality of APs on the plurality of channels may be initiated for a subset of the plurality of APs. For instance, ranging between the plurality of APs on the plurality of channels may include initiating, for each pair of APs of a subset of the plurality of APs, ranging measurements between the pair of APs on the assigned channel(s) to the pair of APs based on the channel assignment permutation. Moreover, the ranging measurements between the plurality of APs on the plurality of channels may occur during successive beacon intervals. For instance, ranging between the plurality of APs on the plurality of channels may include, initiating, for a first pair of APs during a first beacon interval, ranging measurements between the first pair of APs on an assigned channel to the first pair of APs based on the channel assignment permutation, and then initiating, for a second pair of APs during a second beacon interval, ranging measurements between the second pair of APs on an assigned channel to the second pair of APs based on the channel assignment permutation. Two successive beacon intervals may include one or more intervening beacon intervals therebetween.

As used herein, a "beacon" (i.e., a beacon frame) refers to a management frame transmitted by a network device (e.g., network device 100) which contains information about a network that is needed by a station (e.g., client device, another network device, etc.) to communicate with the network device (e.g., transmit a frame) in the network. A beacon may have a frame format in accordance with the IEEE 802.11 standards. For instance, a beacon may comprise an IEEE 802.11 media access control (MAC) header, a body, and a frame check sequence (FCS). The body of the beacon may comprise a timestamp, a beacon interval, a type field that indicates information about the capabilities of the network (e.g., whether the network is infrastructure-based or ad hoc), service set identifiers (SSIDs), supported transmission rates, a frequency-hopping (FH) parameter set, a direct-sequence (DS) parameter set, a contention-free (CF) parameter set, a time indication map (TIM), or a combination thereof. It will be understood that a beacon may have any suitable format in accordance with any suitable standard(s).

As used herein, a "beacon interval" (also known as a "Target Beacon Transmission Time") refers to a frequency of beacon transmissions by a network device (e.g., an AP). That is, a beacon interval refers to a duration of time between successive beacon transmissions (i.e., beacon broadcasts) by a network device. The beacon interval may correspond to an off-channel dwell period, i.e., a period of time in which a network device does not communicate with one or more stations (e.g., client devices) on a given channel. A beacon interval may be measured in time units, wherein a time unit corresponds to 1.024 milliseconds. It will be understood that a beacon interval may be set to 100 time units, 300 time units, or any suitable duration of time. Moreover, each beacon interval may have a same or different (shorter, longer) duration of time as a successive beacon interval.

Initiating ranging measurements between the plurality of APs on the plurality of channels may include configuring the plurality of APs to use channel bandwidths on the plurality of channels to perform the ranging measurements. For instance, a pair of APs of the plurality of APs may be configured to use a channel bandwidth of 80 MHz in a first channel to perform the ranging measurements between the pair of APs. It will be understood that the plurality of APs may be configured to use a channel bandwidth of 20 MHz, 40 MHz, 80 MHz, 160 MHz, or any suitable channel bandwidth on a selected channel, to perform ranging measurements between the plurality of APs. In addition, initiating ranging measurements between the plurality of APs may comprise configuring the plurality of APs to use antenna chains to perform the ranging measurements between the plurality of APs. Configuring the plurality of APs to use antenna chains to perform the ranging measurements between the plurality of APs may comprise selecting, for each AP of the plurality of APs, an antenna of the AP (among one or more antennas of the AP) to perform the ranging measurements. Moreover, initiating the ranging measurements between the plurality of APs may comprise configuring one or more of the plurality of APs to use a transmission effective isotropic radiated power (EIRP) to perform the ranging measurements. For instance, a first AP of the plurality of APs may be configured to use a transmission EIRP of 100% of the available power (i.e., Pmax) for the first AP to perform ranging measurements between the first AP and another AP of the plurality of APs. It will be understood that each AP of the plurality of APs may be configured to use a transmission EIRP of 100% (Pmax), 90%, 75%, or any other suitable percentage of available power for the AP to perform the ranging measurement with one or more other APs of the plurality of APs.

Each of the plurality of ranging measurements (e.g., first ranging measurements, second ranging measurements) between the plurality of APs may include an FTM, a RTT measurement, a time of arrival (ToA) measurement, a Time of Flight (ToF) measurement, an Angle of Arrival (AoA) measurement, an RSSI measurement, a short guard interval (SGI) measurement, a long guard interval (LGI) measurement, channel state information (CSI), or a combination thereof, between one or more pairs of APs of the plurality of APs. It will be understood that the ranging measurements between the plurality of APs may have any suitable format. In addition, the ranging measurements between the plurality of APs may be performed sequentially. For example, the ranging measurements may be performed between a first pair of APs of the plurality of APs (e.g., during first beacon intervals), and then performed between a second pair of APs of the plurality of APs (e.g., during second beacon intervals.)

Each generated ranging result may indicate the ranging measurements between one or more pairs of APs of the plurality of APs. It will be understood that each ranging result may have any suitable format. For instance, the ranging results for the plurality of APs may be indicated by (e.g., included in) one or more data packets which are transmitted by one or more APs of the plurality of APs to computing device 100.

At block 415, method 400 may include determining whether total ranging measurements are performed for a threshold percentage of available links between the plurality of APs on the plurality of channels.

In examples described herein, available links between network devices (e.g., APs) may include any suitable wireless link(s) (e.g., direct, indirect) between one or more pairs of the network devices which can be used to perform ranging between the one or more pairs of the network devices. Each available link between a pair of network devices may be configured on any suitable channel in accordance with any suitable wireless communications standards (e.g., IEEE 802.11.) The available links between the network devices are established via one or more radios that are included in each of the network devices.

The threshold percentage of available links between the plurality of APs on the plurality of channels may correspond to a threshold ratio of available links between the plurality of APs in the network for all available channel assignment permutations (i.e., for all channel assignment permutations in the set of available channel assignment permutations.) Each of the available links between the plurality of APs may correspond to any suitable available antenna path(s) and any suitable available channel(s) to establish the link between the plurality of APs. At block 415, if it is determined that the total ranging measurements are not performed for the threshold percentage of available links between the plurality of APs on the plurality of channels, then method 400 returns to block 405. Conversely, if it is determined that the total ranging measurements are performed for the threshold percentage of available links between the plurality of APs on the plurality of channels, then method 400 proceeds to block 420.

When method 400 returns to block 405, method 400 may include assigning the plurality of channels to the plurality of APs based on another channel assignment permutation (within the set of available channel assignment permutations) for which ranging measurements have not yet been initiated. For instance, when method 400 returns to block 405, a second channel assignment permutation for which ranging has not yet been initiated may be selected, and the plurality of channels may be assigned to the plurality of APs according to the selected second channel assignment permutation, and additional ranging measurements (e.g., second ranging measurements) may be initiated based on the selected second channel assignment permutation to generate a second ranging result when method 400 returns to block 410. Alternatively, when method 400 returns to block 405, method 400 may include assigning the plurality of channels to the plurality of APs based on a channel assignment permutation for which ranging measurements were previously initiated (or attempted to be initiated) to generate another ranging result (e.g., second ranging result) when method 400 returns to block 410.

Method 400 may repeatedly return to block 405 from block 415 until total ranging measurements are performed for a threshold percentage of links between the plurality of APs on the plurality of channels. The threshold percentage of links between the plurality of APs on the plurality of channels may include: (1) a threshold percentage of links between the plurality of APs on the plurality of channels for each channel assignment permutation, and (2) a threshold percentage of links between the plurality of APs on the plurality of channels for all channel assignment permutations in the set of channel assignment permutations.

At block 420, method 400 may include, based on (e.g., in response to) each ranging result (e.g., first ranging result, second ranging result), resolving locations of the plurality of APs.

For instance, at block 420, method 400 may include, based on (e.g., in response to) receiving the first ranging result and the second ranging result, resolving the locations of the plurality of APs.

Resolving the locations of the plurality of APs may include estimating the locations (e.g., coordinates) of the APs on an AP map (e.g., a map of relative AP locations on a visual floor plan) based on the ranging results. Techniques for resolving the locations of the APs based on ranging results (e.g., FTMs) are described further in the following patent applications, which are hereby incorporated by reference.

U.S. application Ser. No. 16/831,213, filed Mar. 26, 2020, in the name of the inventors Vikram Raghu, Eldad Perahia, Sachin Ganu, Sai Pradeep Venkatraman, and Chuck Lukaszewski, and entitled "AUTOMATIC LOCATION OF ACCESS POINTS IN A NETWORK", which is commonly assigned herein.

U.S. application Ser. No. 17/218,309, filed Mar. 31, 2021, in the name of the inventors Amogh Guruprasad Deshmukh, Eldad Perahia, Gaurav Patwardhan, and Sachin Ganu, and entitled "HANDLING FINE TIMING MEASUREMENT REQUESTS", which is commonly assigned herein.

U.S. application Ser. No. 17/229,954, filed Apr. 14, 2021, in the name of the inventors Omar El Ferkouss, Andre Beaudin, and Sachin Ganu, and entitled "FINE TIMING MEASUREMENTS IN ENTERPRISE DEPLOYMENTS USING HIGH BANDWIDTH CHANNELS", which is commonly assigned herein.

U.S. application Ser. No. 17/337,679, filed Jun. 3, 2021, in the name of the inventors Sachin Ganu, Chuck Lukaszewski, Gaurav Patwardhan, Eldad Perahia, Vikram Raghu, and Stuart Wal Strickland, and entitled "AUTOMATIC LOCATION OF ACCESS POINTS IN A NETWORK", which is commonly assigned herein.

In the event of conflict between the incorporated applications and the present disclosure, the present specification, including definitions, controls.

In this manner, method 400 of FIG. 4 may provide multiple channel assignments for ranging between APs in a network during beacon intervals, thereby increasing the accuracy of ranging between the APs. For instance, method 400 may include determining, by computing device 100, whether total ranging measurements are performed for a threshold percentage of total available links between a plurality of APs on a plurality of channels, thereby ensuring that the ranging measurements performed between the APs utilize multiple available channel assignments for each AP. Moreover, method 400 may include, based on a determination that the total ranging measurements are not performed for the threshold percentage of total available links between the APs, assigning, by computing device 100, the plurality of channels to the plurality of APs based on a second channel assignment permutation, and initiating, by computing device 100 during second beacon intervals, second ranging measurements between the plurality of APs based on the second channel assignment permutation to generate a second ranging result, thus performing ranging measurements between the APs which utilize multiple available channel assignments for each AP, and thereby creating a diversity of channels for the ranging measurements and increasing the accuracy of ranging between the APs.

In some examples, method 400 may include initiating the plurality of APs to transmit a plurality of beacons, wherein the beacon intervals (e.g., first beacon intervals, second beacon intervals) are between the transmissions of the plurality of beacons.

Figure 5:
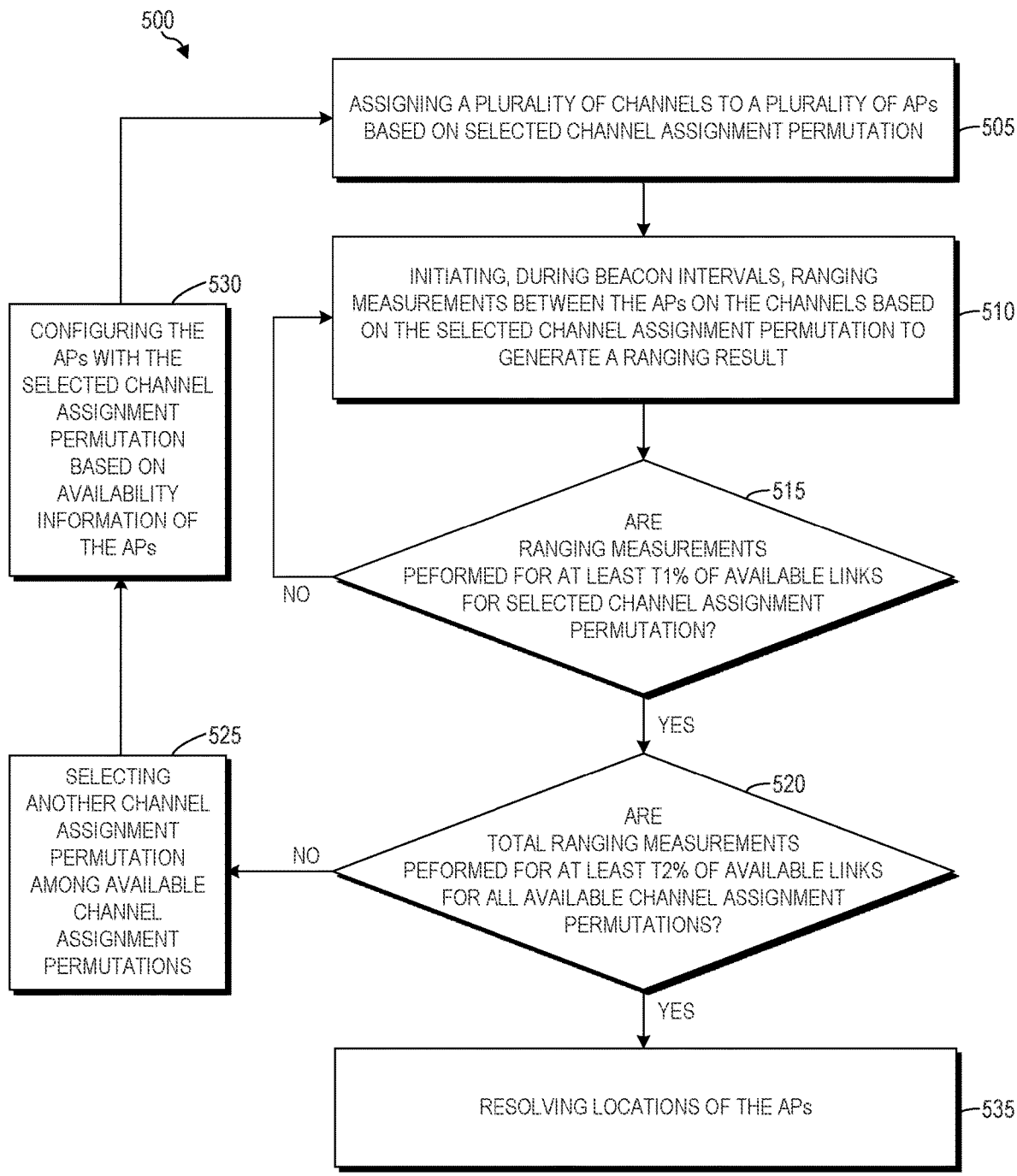
FIG. 5 is a flowchart of an example method for providing channel assignments for ranging between APs in a network during beacon intervals.

Referring to FIG. 5, a flowchart depicting a method 500 for providing channel assignments for ranging between APs in a network during beacon intervals is presented in some examples. Although the execution of method 500 is described below with reference to computing device 100 of FIG. 1, any suitable computing device for the execution of method 500 may be utilized. Additionally, the implementation of method 500 is not limited to such examples. While method blocks 505 to 535 are shown in method 500, method 500 may include other actions described herein. Additionally, although the blocks are shown in an order, blocks depicted in FIG. 5 may be performed in any suitable order and at any time. Moreover, one or more of blocks of method 500 may be performed in combination with one or more blocks of method 400. Also, some of the blocks shown in method 500 may be omitted without departing from the spirit and scope of this disclosure.

At block 505, method 500 may include assigning a plurality of channels to a plurality of APs in a network based on a selected channel assignment permutation. Block 505 may include the same or similar steps as described above in relation to block 405 of method 400. The selected channel assignment permutation may be selected from a set of available channel assignment permutations for performing ranging measurements between the plurality of APs on the plurality of channels. An order for selecting a channel assignment permutation among the set of channel assignment permutations may be determined by computing device 100, may be random, or may be received from (e.g., indicated by) an external source (e.g., input from a user, server, cloud computing resource, etc.) The order in which an initial channel assignment permutation is selected among available channel assignment permutations may be according to a channel assignment plan for the plurality of APs.

At block 510, method 500 may include initiating, during beacon intervals, ranging measurements between the plurality of APs on the plurality of channels based on the selected channel assignment permutation to generate a ranging result. Block 510 may include the same or similar steps as described above in relation to block 410 of method 400.

At block 515, method 500 may include determining whether the ranging measurements are performed for at least a threshold percentage T1 of all available links between the plurality of APs for the selected channel assignment permutation.

The threshold percentage T1 for a selected channel assignment permutation may correspond to a threshold percentage of all available links between each pair of APs of the plurality of APs for the channel assignment permutation. The threshold percentage T1 may be set to any suitable value. For example, the threshold percentage T1 may be set to 80%, 90%, 95%, 100%, etc., of all available links between each pair of APs of the plurality of APs. A threshold percentage T1 for one channel assignment permutation (e.g., first channel assignment permutation) may be the same or different than a threshold percentage T1 for another channel assignment permutation (e.g., second channel assignment permutation.) For instance, the threshold percentage T1 for a first channel assignment permutation may be 85%, and the threshold percentage T1 for a second channel assignment permutation may be 90%. Alternatively, for instance, the threshold percentage T1 each of a first channel assignment permutation and a second channel assignment permutation may be 85%. Each of the available links between each pair of APs of the plurality of APs may correspond to any suitable available antenna path(s) and any suitable available channel(s) to establish the link between the pair of APs.

At block 515, if it is determined that the ranging measurements are performed for a threshold percentage T1 of available links between the plurality of APs for the selected channel assignment permutation, then method 515 proceeds to block 520. At block 515, if it is determined that the ranging measurements are not performed for the threshold percentage T1 of available links between the plurality of APs for the selected channel assignment permutation, then method 500 returns to block 510. That is, method 500 returns to block 510 to initiate, during subsequent beacon intervals (e.g., second beacon intervals), ranging measurements between the APs on the plurality of channels based on the selected channel assignment permutation to generate another ranging result (e.g., second ranging result.) Method 500 may repeatedly return to block 510 from block 515: (1) until the ranging measurements are performed for the threshold percentage T1 of available links between the plurality of APs for the selected channel permutation, or (2) up to a set number of times (e.g., two times, three times, ten times, etc.) The set number of times may be determined by computing device 100 or received from (e.g., indicated by) an external source (e.g., user input, server, cloud computing resource, etc.)

At block 520, method 500 may include determining whether total ranging measurements are performed for at least a threshold percentage T2 of all available links between the plurality of APs for all available channel assignment permutations.

The threshold percentage T2 may correspond to a threshold percentage of all available links between each pair of APs of the plurality of APs for all available channel assignment permutations (e.g., in the set of channel assignment permutations.) The threshold percentage T2 may be set to any suitable value. For example, the threshold percentage T1 may be set to 80%, 90%, 95%, 100%, etc., of all available links between the plurality of APs for all available channel assignment permutations. Each of the available links between each pair of APs of the plurality of APs may correspond to any suitable available antenna path(s) and any suitable available channel(s) to establish the link between the pair of APs.

At block 520, if it is determined that the total ranging measurements are not performed for at least the threshold percentage T2 of available links between the plurality of APs on the plurality of channels, then method 500 proceeds to block 525. At block 520, if it is determined that the total ranging measurements are performed for at least the threshold percentage T2 of available links between the plurality of APs for all available channel assignment permutations, then method 500 proceeds to block 535.

At block 525, method 500 may include selecting another channel assignment permutation among available channel assignment permutations (e.g., among the set of available channel assignment permutations.) The order in which subsequent channel assignment permutations are selected among available channel assignment permutations (at block 525) may be determined by computing device 100, may be random, or may be received from (e.g., indicated by) an external source (e.g., user input, server, cloud resource, etc.) The order in which subsequent channel assignment permutations are selected among available channel assignment permutations may be according to a channel assignment plan for the plurality of APs.

At block 530, method 500 may include configuring the APs with the selected channel assignment permutation based on availability information for the plurality of APs.

The availability information for the plurality of APs may include a time of day that corresponds to an operating state (or expected operating state) of the plurality of APs. For instance, the availability information may correspond to a set time of day (e.g., a time outside of working hours at an office) when the APs may have a reduced load capacity (or an expected reduced load capacity.) Thus, method 500 may include configuring the APs with the selected channel assignment permutation at an opportune time (e.g., outside of working hours at an office) to reduce the likelihood that configuring the APs would cause disruptions to communications by the APs (e.g., communications between the APs and client devices connected to the APs.)

The availability information for the plurality of APs may be based on a signal quality measurement between the plurality of APs. The signal quality measurement may include an FTM, a RTT measurement, a ToA measurement, a ToF measurement, an AoA measurement, an RSSI measurement, an SGI measurement, an LGI measurement, CSI, or a combination thereof, between the plurality of APs. It will be understood that the availability information for the plurality of APs may have any suitable format. Moreover, the availability information for the plurality of APs may be determined by computing device 100, or received by computing device 100 from an external source. For instance, the availability information may be indicated by (e.g., included in) one or more data packets which are received by computing device 100 from another device (e.g., network device) in the network.

The availability information for the plurality of APs may be based on a client load of one or more of the plurality of APs. That is, the availability information may be based on a bandwidth of communications between one or more of the plurality of APs with one or more client devices that are connected to the plurality of APs.

In some examples, configuring the APs with the selected channel assignment permutation may be independent of a channel assignment plan for the plurality of APs. The channel assignment plan for the plurality of APs may include one or more channel assignment permutations for assigning the plurality of channels to the plurality of network devices. Moreover, the channel assignment plan may include a minimum signal quality improvement threshold to change the configuration of the plurality of network devices from one channel assignment permutation (e.g., first channel assignment permutation) to another channel assignment permutation (e.g., second channel assignment permutation.) For instance, at block 530, method 500 may include configuring the plurality of APs according to a second channel assignment permutation, even though, for a given channel assignment plan for the plurality of APs, a minimum signal quality improvement threshold has not been satisfied to trigger a change in configuration of the channel assignment permutation from a first channel assignment permutation to the second channel assignment permutation. Thus, configuring the APs with the selected channel assignment permutation according to method 500 may generate a diversity of channels in the ranging measurements, even when a channel plan for the plurality of APs would not otherwise reconfigure the AP according to another channel assignment permutation to perform the ranging between the plurality of APs.

At block 535, method 500 may include, based on (e.g., in response to) each ranging result (e.g., first ranging result, second ranging result), resolving locations of the plurality of APs. Block 535 may include the same or similar steps as described above in relation to block 420 of method 400.

In this manner, method 500 of FIG. 5 may provide multiple channel assignments for ranging between APs in a network during beacon intervals, thereby increasing the accuracy of ranging between the APs. For instance, method 500 may include determining, by computing device 100, whether ranging measurements are performed for at least a threshold percentage T1 of available links for a selected channel assignment permutation, thereby ensuring that a sufficient number of ranging measurements are performed between the plurality of APs to provide reliable ranging results for a given channel assignment permutation. Moreover, method 500 may include determining, by computing device 100, whether total ranging measurements are performed for at least a threshold percentage T2 of all available links for all available channel assignment permutations (e.g., for a set of available channel assignment permutations), thus providing a diversity of channels in the ranging measurements performed between the plurality of APs to ensure reliable ranging results. In addition, method 500 may include, configuring, by computing device 100, the plurality of APs with a selected channel assignment permutation based on availability information of the plurality of APs, thereby ensuring that reconfiguring the plurality of APs according to a selected channel assignment permutation is performed at an opportune time to reduce the likelihood of causing disruptions to communications by the APs (e.g., communications between the APs and client devices connected to the APs.)

System/Computing System

Figure 2:
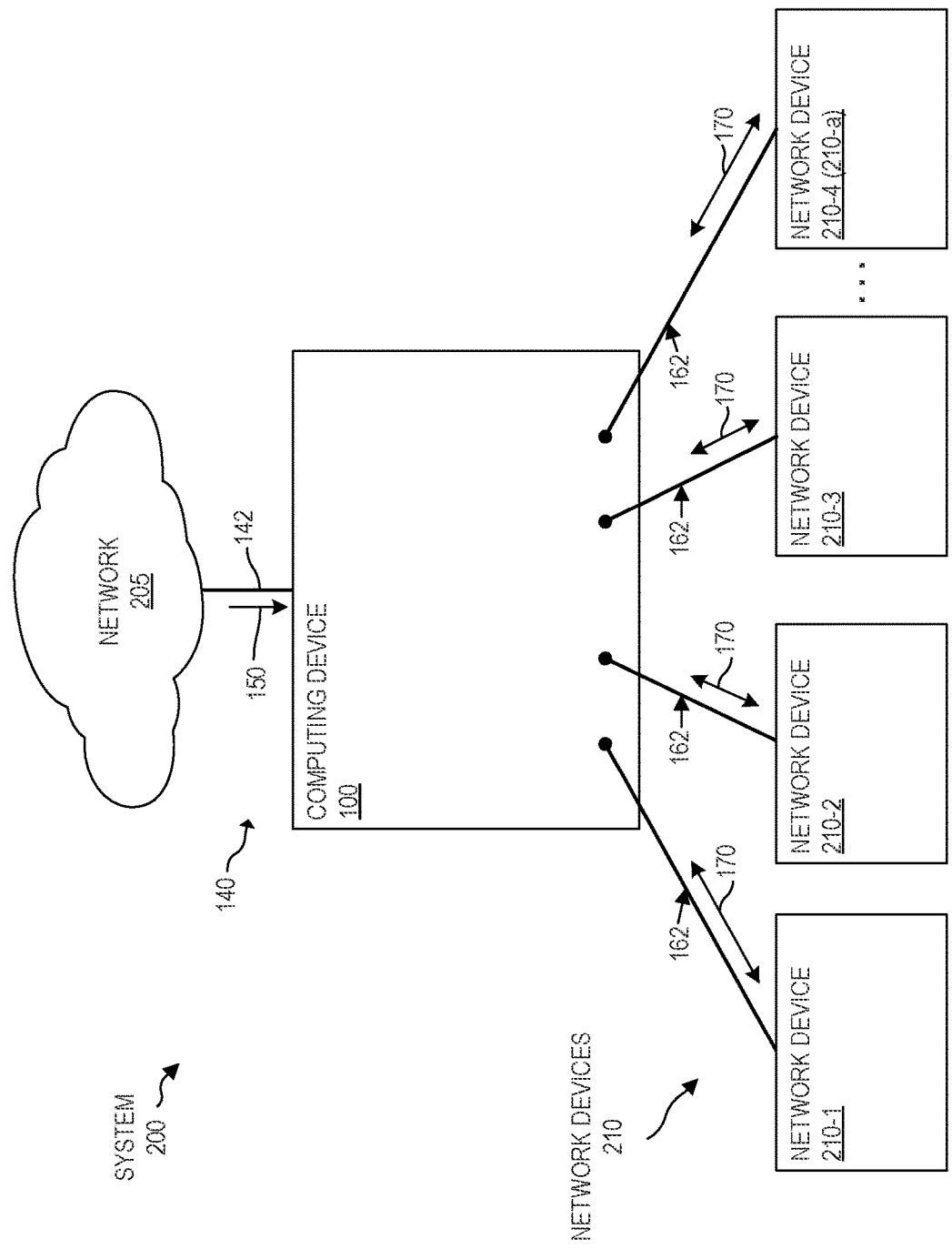
FIG. 2 shows a block diagram for an example system for providing channel assignments for ranging between APs in a network during beacon intervals.

FIG. 2 is a block diagram of an example system 200 including a computing device for channel assignments for ranging between APs in a network during beacon intervals. System 200 includes computing device 100 (as described above in relation to FIG. 1) that is connected to a network 205. In addition, system 200 includes a plurality of network devices 210 that are connected to network 205. Network devices 210 include a plurality of network devices 210-1 to 210-a, wherein a is an integer and represents a total number of the network devices 210. Although FIG. 2 illustrates that network devices 210 includes four network devices (210-1, 210-2, 210-3, 210-4), it will be understood that system 200 can include, two, three, ten, or any suitable number of network devices 210.

In the example of FIG. 2, network 205 may comprise one or more local area networks (LANs), virtual LANs (VLANs), wireless local area networks (WLANs), virtual private networks (VPNs), wide area networks (WANs), the Internet, or the like, or a combination thereof. As used herein, a "wide area network" or "WAN" may comprise, for example, a wired WAN, wireless WAN, hybrid WAN, software-defined WAN (SD-WAN), or a combination thereof. In addition, network 205 may comprise one or more cellular networks using one or more mobile communications standards (e.g., 3G, 4G, 5G, etc.). It will be understood that system 200 may comprise any suitable type(s) of network(s) 205. Moreover, although FIG. 2 shows that a single computing device 100 is connected to network 205, it will be understood that any suitable number of computing devices (in addition to computing device 100) may be connected to network 205.

In the example of FIG. 2, each of the network devices 210 includes a radio (not shown) to communicate with computing device 100, with one or more other network devices 210, or a combination thereof. The radio(s) may generate a signal in one or more frequency bands, process a signal in one or more frequency bands, or a combination thereof. The radio(s) of network devices 210 may operate at any suitable frequency band(s) and conform to any suitable type(s) of wireless communication standards, now known or later developed. For instance, one or more radios of network devices 210 may operate at one or more channels in the 2.4 GHz band and/or 5 GHz band, in accordance with the IEEE 802.11ac and/or 802.11ax standards. Moreover, each of network devices 210 may each include one, two, four, or any other suitable number(s) of radios.

In the example of FIG. 2, each of the network devices 210 may communicate with one or more client devices (e.g., communication devices) that are connected to the network device. For instance, one or more communication devices such as a laptop computer, a desktop computer, a mobile device, and/or other wireless devices, etc., may be connected to one or more network devices 210. Each of the network devices 210 may communicate with one or more client devices via a radio. In examples described herein, a "mobile device" refers to a device that is (or may be) carried and/or worn by a user. For instance, a mobile device can be a phone (e.g., a smartphone), a tablet, a personal digital assistant (PDA), smart glasses, and/or a wrist-worn device (e.g., a smartwatch), among other types of mobile devices.

In the example of FIG. 2, computing device 100 may be configured to receive network request(s) 150 via a network path(s) 140 to establish communication with one or more of network devices 210 (as described above in relation to FIG. 1.) For instance, computing device 100 may receive a signal from network 205 containing network request 150 (as described above in relation to FIG. 1.)

In the example of FIG. 2, computing device 100 may be configured to send or receive communication signal(s) 170 via communication path(s) 160 to establish communication with one or more network devices 210 (as described above in relation to FIG. 1.)

In the example of FIG. 2, network devices 210 may engage in any network data transmission operations, including, but not limited to, switching, routing, bridging, or a combination thereof. In addition, one or more network devices 210 may comprise a wireless AP (WAP). In examples described herein, a "WAP" generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood that network devices 210 may include any suitable type(s) of network device(s) made by any suitable manufacturer(s).

In the example of FIG. 2, computing device 100 is configured to (e.g., encoded with non-transitory machine-readable instructions executable by at least one processing resource 110) to perform AP channel assigning instructions 122, ranging initiating instructions 124, link threshold determining instructions 126, and AP location resolving instructions 128, as described above in relation to FIG. 1.

Computing device 100 may be configured to assign a plurality of channels to network devices 210 in network 205 based on a first channel assignment permutation of a set of available channel assignment permutations. For example, according to the first channel assignment permutation, computing device 100 may assign channel 36 to network device 210-1, assign channel 52 to network device 210-2, assign channel 149 to network device 210-3, and assign channel 108 to network device 210-4.

Then, computing device 100 may be configured to initiate, during first beacon intervals, first ranging measurements between the plurality of APs on the plurality of channels based on the first channel assignment permutation to generate a first ranging result. For instance, in the example described above, computing device 100 may, during first beacon intervals, initiate pairwise FTM ranging between network device 210-1 and network device 210-2 on channels 36 and 52, between network device 210-1 and network device 210-3 on channels 36 and 149, between network device 210-1 and network device 210-4 on channels 36 and 108, between network device 210-2 and network device 210-3 on channels 52 and 149, between network device 210-2 and network device 210-4 on channels 52 and 108, and between network device 210-3 and network device 210-4 on channels 149 and 108, to generate the first ranging result. The channels on which pairwise FTM ranging is performed between the plurality of APs on the plurality of channels, according to the first channel assignment permutation, are shown in Table 1 below.

TABLE 1

| Network device | 210-1 | 210-2 | 210-3 | 210-4 |
| --- | --- | --- | --- | --- |
| 210-1 | n/a | 52 | 149 | 108 |
| 210-2 | 36 | n/a | 149 | 108 |
| 210-3 | 36 | 52 | n/a | 108 |
| 210-4 | 36 | 52 | 149 | n/a |

Next, computing device 100 may be configured to determine whether total ranging measurements are performed for a threshold percentage of available links between the plurality of APs on the plurality of channels, wherein the total ranging measurements include the first ranging measurements. Specifically, computing device 100 may be configured to determine whether the ranging measurements are performed for at least a threshold percentage T1 of all available links between the plurality of APs for the first channel assignment permutation. Moreover, based on a determination that the ranging measurements are performed for at least the threshold percentage T1 of all available links between the plurality of APs for the first channel assignment permutation, computing device 100 may be configured to determine whether the total ranging measurements are performed for at least a threshold percentage T2 of available links between the plurality of APs for all available channel assignment permutations in the set of available channel assignment permutations.

Based on a determination that the total ranging measurements are not performed for the threshold percentage T2 of available links between the plurality of APs for all available channel assignment permutations, computing device 100 may be configured to select another available channel assignment permutation of the set of available channel assignment permutations for which ranging has not yet been performed. For instance, computing device 100 may select a second channel assignment permutation among the set of available channel assignment permutations, for which computing device 100 assigns channel 149 to network device 210-1, assigns channel 36 to network device 210-2, assigns channel 108 to network device 210-3, and assigns channel 52 to network device 210-4.

Next, computing device 100 may be configured to configure the plurality of APs with the selected second channel assignment permutation based on availability information of the plurality of APs. For instance, computing device 100 may configure the plurality of APs according to the second channel assignment permutation during a time of day which is outside of normal working hours in an office. Moreover, computing device 100 may configure the plurality of APs according to the second channel assignment permutation based on signal quality measurements (e.g., CSI) received from the plurality of APs.

Then, computing device 100 may be configured to initiate, during second beacon intervals, second ranging measurements between the plurality of APs on the plurality of channels based on the second channel assignment permutation to generate a second ranging result. For instance, in the example described above, computing device 100 may, during second beacon intervals, initiate pairwise FTM ranging between network device 210-1 and network device 210-2 on channels 149 and 36, between network device 210-1 and network device 210-3 on channels 149 and 108, between network device 210-1 and network device 210-4 on channels 149 and 52, between network device 210-2 and network device 210-3 on channels 36 and 108, between network device 210-2 and network device 210-4 on channels 36 and 52, and between network device 210-3 and network device 210-4 on channels 108 and 52, to generate the second ranging result. The channels on which pairwise FTM ranging is performed between the plurality of APs on the plurality of channels, according to the first and second channel assignment permutations, are shown in Table 2 below.

TABLE 2

| Network device | 210-1 | 210-2 | 210-3 | 210-4 |
| --- | --- | --- | --- | --- |
| 210-1 | n/a | 52, 36 | 149, 108 | 108, 52 |
| 210-2 | 36, 149 | n/a | 149, 108 | 108, 52 |
| 210-3 | 36, 149 | 52, 36 | n/a | 108, 52 |
| 210-4 | 36, 149 | 52, 36 | 149, 108 | n/a |

Moreover, computing device 100 may be configured to initiate subsequent ranging measurements between the plurality of APs on the plurality of channels according to one or more additional channel assignment permutations of the set of available channel assignment permutations.

For instance, the channels on which pairwise FTM ranging are performed between the plurality of APs on the plurality of channels, according to the first and second channel assignment permutations, and additionally according to a third channel assignment permutation, are shown in Table 3 below.

TABLE 3

| Network device | 210-1 | 210-2 | 210-3 | 210-4 |
| --- | --- | --- | --- | --- |
| 210-1 | n/a | 52, 36, 149 | 149, 108, 52 | 108, 52, 36 |
| 210-2 | 36, 149, 108 | n/a | 149, 108, 52 | 108, 52, 36 |
| 210-3 | 36, 149, 108 | 52, 36, 149 | n/a | 108, 52, 36 |
| 210-4 | 36, 149, 108 | 52, 36, 149 | 149, 108, 52 | n/a |

In addition, for instance, the channels on which pairwise FTM ranging are performed between the plurality of APs on the plurality of channels, according to the first, second, and third channel assignment permutations, and additionally according to a fourth channel assignment permutation, are shown in Table 4 below.

TABLE 4

| Network device | 210-1 | 210-2 | 210-3 | 210-4 |
| --- | --- | --- | --- | --- |
| 210-1 | n/a | 52, 36, 149, 108 | 149, 108, 52, 36 | 108, 52, 36, 149 |
| 210-2 | 36, 149, 108, 52 | n/a | 149, 108, 52, 36 | 108, 52, 36, 149 |
| 210-3 | 36, 149, 108, 52 | 52, 36, 149, 108 | n/a | 108, 52, 36, 149 |
| 210-4 | 36, 149, 108, 52 | 52, 36, 149, 108 | 149, 108, 52, 36 | n/a |

Based on a determination that the total ranging measurements are performed for the threshold percentage of links (e.g., ≥90%) between the plurality of APs on the plurality of channels for all available channel assignment permutations in the set of available channel assignment permutations (i.e., the first channel assignment permutation, second channel assignment permutation, third channel assignment permutation, and fourth channel assignment permutation), computing device 100 may be configured to resolve the locations of the plurality of APs based on the first ranging result and the second ranging result.

In this manner, computing device 100 of system 200 of FIG. 2 may provide multiple channel assignments for ranging between network devices 210-1 to 210-4 in a network during beacon intervals, thereby increasing the accuracy of ranging between the APs. For instance, computing device 100 may be configured to determine whether ranging measurements are performed for at least a threshold percentage T1 of available links for a selected channel assignment permutation, thereby ensuring that a sufficient number of ranging measurements are performed between network devices 210-1 to 210-4 to ensure reliable ranging results for a given channel assignment permutation. Moreover, computing device 100 may be configured to determine whether total ranging measurements are performed for at least a threshold percentage T2 of all available links for all available channel assignment permutations (e.g., for the set of available channel assignment permutations), thus providing a diversity of channels in the ranging measurements performed between the network devices 210-1 to 210-4 to ensure reliable ranging results. In addition, computing device 100 may be configured to configure network devices 210-1 to 210-4 with a selected channel assignment permutation based on availability information of network devices 210-1 to 210-4, thereby ensuring that the reconfiguration of network devices 210-1 to 210-4 according to a selected channel assignment permutation is performed at an opportune time to reduce the likelihood of causing disruptions to communications by network devices 210-1 to 210-4 (e.g., communications between the network devices 210-1 to 210-4 and client devices connected to network devices 210-1 to 210-4.)

Figure 6:
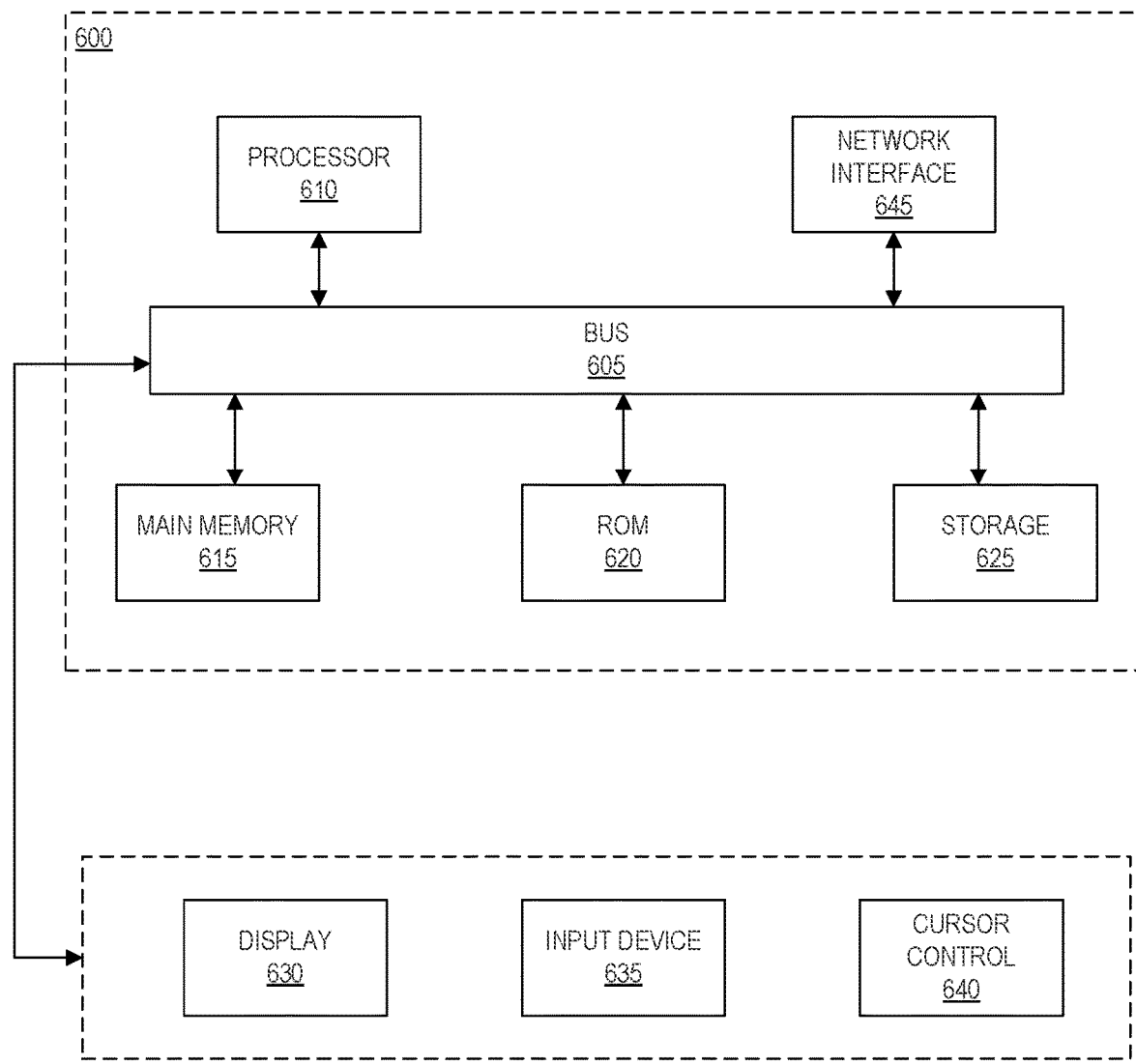
FIG. 6 is a block diagram of an example computer system in which various embodiments described herein may be implemented for providing channel assignments for ranging between APs in a network during beacon intervals.

FIG. 6 is a block diagram of an example computer system 600 in which various embodiments described herein may be implemented for coordinated ranging between access points in a network.

Computer system 600 includes bus 605 or other communication mechanism for communicating information, at least one hardware processor 610 coupled with bus 605 for processing information. At least one hardware processor 610 may be, for example, at least one general purpose microprocessor.

Computer system 600 also includes main memory 615, such as random access memory (RAM), cache, other dynamic storage devices, or the like, or a combination thereof, coupled to bus 605 for storing information and one or more instructions to be executed by at least one processor 610. Main memory 615 also may be used for storing temporary variables or other intermediate information during execution of one or more instructions to be executed by at least one processor 610. In some examples, the one or more instructions may comprise one or more of AP channel assigning instructions 122, ranging initiating instructions 124, link threshold determining instructions 126, and AP location resolving instructions 128 (as described above in relation FIGS. 1, 2, 4, and 5). Such one or more instructions, when stored on storage media accessible to at least one processor 610, render computer system 600 into a special-purpose machine that is customized to perform the operations specified in the one or more instructions.

Computer system 600 may further include read only memory (ROM) 620 or other static storage device coupled to bus 605 for storing one or more instructions to be executed by at least one processor 610. In some examples, the one or more instructions may comprise one or more of AP channel assigning instructions 122, ranging initiating instructions 124, link threshold determining instructions 126, and AP location resolving instructions 128 (as described above in relation FIGS. 1, 2, 4, and 5). Such one or more instructions, when stored on storage media accessible to at least one processor 610, render computer system 600 into a special-purpose machine that is customized to perform the operations specified in the one or more instructions.

Computer system 600 may further include information and one or more instructions for at least one processor 610. At least one storage device 625, such as a magnetic disk, optical disk, or USB thumb drive (Flash drive), or the like, or a combination thereof, may be provided and coupled to bus 605 for storing information and one or more instructions. In some examples, the one or more instructions may comprise one or more of AP channel assigning instructions 122, ranging initiating instructions 124, link threshold determining instructions 126, and AP location resolving instructions 128 (as described above in relation FIGS. 1, 2, 4, and 5).

Computer system 600 may further include display 630 coupled to bus 605 for displaying a graphical output to a user. The computer system 600 may further include input device 635, such as a keyboard, camera, microphone, or the like, or a combination thereof, coupled to bus 605 for providing an input from a user. Computer system 600 may further include cursor control 640, such as a mouse, pointer, stylus, or the like, or a combination thereof, coupled to bus 605 for providing an input from a user.

Computer system 600 may further includes at least one network interface 645, such as a network interface controller (NIC), network adapter, or the like, or a combination thereof, coupled to bus 605 for connecting computer system 600 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 based on (e.g., in response to) at least one processor 610 executing one or more sequences of one or more instructions contained in main memory 615. Such one or more instructions may be read into main memory 615 from another storage medium, such as at least one storage device 625. Execution of the sequences of one or more instructions contained in main memory 615 causes at least one processor 610 to perform the process steps described herein. In alternative embodiments, hard-wired circuitry may be used in place of or in combination with software instructions.

As used herein, an RTT (also known as a round trip delay or ping time) corresponds to a period of time for a signal (e.g., a data packet) to travel across a network from a starting point (e.g., a first network device) to a destination point (e.g., a second network device) and for an acknowledgement of that signal to be returned to the starting point. The RTT measurement may be based on propagation delay, processing delay, queuing delay, encoding delay, or a combination thereof. It will be understood that the RTT may be computed based on any suitable techniques in accordance with any suitable protocol(s) (e.g., Transmission Control Protocol).

As used herein, CSI refers to known channel properties of a wireless signal between a transmitter and a receiver (e.g., between a first AP and a second AP.) CSI is used to determine how a wireless signal propagates between the transmitter and the receiver and represents the combined effect, for example, of scattering, fading, and power decay of the transmitted wireless signal with distance.

In examples described herein, the term "Wi-Fi" is meant to encompass any type of wireless communications that conforms to any IEEE 802.11 standards, whether 802.11ac, 802.11ax, 802.11a, 802.11n, 802.11ad, 802.11ay, etc. The term "Wi-Fi" is currently promulgated by the Wi-Fi Alliance®. Any products tested and approved as "Wi-Fi Certified" (a registered trademark) by the Wi-Fi Alliance® are certified as interoperable with each other, even if they are from different manufacturers. A user with a "Wi-Fi Certified" (a registered trademark) product can use any brand of WAP with any other brand of client hardware that also is certified. Typically, however, any Wi-Fi product using the same radio frequency band (e.g., 60 GHz band for 802.11ad or 802.11ay) will work with any other, even if such products are not "Wi-Fi Certified." The term "Wi-Fi" is further intended to encompass future versions and/or variations on the foregoing communication standards. Each of the foregoing standards is hereby incorporated by reference.

In examples described herein, the term "non-transitory media," and similar terms, refers to any electronic, magnetic, optical, or other physical storage device that contains or stores executable instructions. Non-transitory media may comprise non-volatile media and/or volatile media. Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening element, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but is not limited to, the term "including" means including but not limited to. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method, comprising:
    assigning, by a computing device, a plurality of channels to a plurality of access points (APs) in a network based on a first channel assignment permutation;
    initiating, by the computing device during first beacon intervals, first ranging measurements between the plurality of APs on the plurality of channels based on the first channel assignment permutation to generate a first ranging result;
    determining, by the computing device, whether total ranging measurements are performed for at least a threshold percentage of available links between the APs on the plurality of channels, wherein the total ranging measurements include the first ranging measurements;
    based on a determination that the total ranging measurements are not performed for the threshold percentage of the available links between the APs on the plurality of channels, assigning, by the computing device, the plurality of channels to the plurality of APs based on a second channel assignment permutation;
    initiating, by the computing device during second beacon intervals, second ranging measurements between the plurality of APs on the plurality of channels based on the second channel assignment permutation to generate a second ranging result; and
    based on the first ranging result and the second ranging result, resolving, by the computing device, locations of the plurality of APs.

2. The method of claim 1, wherein initiating the first ranging measurements between the plurality of APs on the plurality of channels based on the first channel assignment permutation comprises:
    for each pair of APs of the plurality of APs:
        initiating, by the computing device, ranging measurements between a first AP of the pair of APs and a second AP of the pair of APs on a first channel assigned to the first AP based on the first channel assignment permutation; and
        initiating, by the computing device, ranging measurements between the first AP and the second AP on a second channel assigned to the second AP based on the first channel assignment permutation.

3. The method of claim 1, wherein the available links between the plurality of APs on the plurality of channels are based on a set of channel assignment permutations, wherein the set of channel assignment permutations includes the first channel assignment permutation and the second channel assignment permutation.

4. The method of claim 1, comprising:
    determining, by the computing device, whether the first ranging measurements are performed for at least a second threshold percentage of available links between the plurality of APs on the plurality of channels based on the first channel assignment permutation;
    based on a determination that the first ranging measurements are not performed for at least the second threshold percentage of available links, initiating, by the computing device during third beacon intervals, third ranging measurements between the plurality of APs based on the first channel assignment permutation to generate a third ranging result;

wherein resolving the locations of the plurality of APs is based on the third ranging result.

5. The method of claim 1, comprising:
based on a determination that the total ranging measurements are not performed for at least the threshold percentage of the available links between the APs on the plurality of channels:
selecting, by the computing device, the second channel assignment permutation among a set of available channel assignment permutations; and
configuring, by the computing device, the plurality of APs with the second channel assignment permutation based on availability information of the plurality of APs.

6. The method of claim 5, wherein the availability information of the plurality of APs is based on a time of day that corresponds to an operating state of the plurality of APs.

7. The method of claim 5, wherein the availability information of the plurality of APs is based on a signal quality measurement between the plurality of APs.

8. The method of claim 5, wherein the availability information of the plurality of APs is based on a client load for the plurality of APs.

9. The method of claim 5, wherein the availability information of the plurality of APs is independent of a channel assignment plan for the plurality of APs.

10. The method of claim 1, comprising:
initiating, by the computing device, the plurality of APs to transmit a plurality of beacons, wherein the first beacon intervals and second beacon intervals are between the transmission of the plurality of beacons.

11. A computing device, comprising:
a processing resource; and
a non-transitory machine-readable storage medium comprising instructions executable by the processing resource to:
assign a plurality of channels to a plurality of access points (APs) based on a first channel assignment permutation;
initiate, during first beacon intervals, first ranging measurements between the plurality of APs on the plurality of channels based on the first channel assignment permutation to generate a first ranging result;
determine that total ranging measurements are not performed for a threshold percentage of available links between the plurality of APs on the plurality of channels, wherein the total ranging measurements include the first ranging measurements;
assign the plurality of channels to the plurality of APs based on a second channel assignment permutation; and
initiate, during second beacon intervals, second ranging measurements between the plurality of APs on the plurality of channels based on the second channel assignment permutation to generate a second ranging result; and
resolve locations of the plurality of APs based on the first ranging result and the second ranging result.

12. The computing device of claim 11, wherein the instructions to initiate the first ranging measurements between the plurality of APs on the plurality of channels based on the first channel assignment permutation comprise instructions to:
for each pair of APs of the plurality of APs:
initiate ranging measurements between a first AP of the pair of APs and a second AP of the pair of APs on a first channel assigned to the first AP based on the first channel assignment permutation; and
initiate ranging measurements between the first AP and the second AP on a second channel assigned to the second AP based on the first channel assignment permutation.

13. The computing device of claim 11, wherein the instructions comprise instructions to:
determine that the total ranging measurements are not performed for a second threshold percentage of available links based on the first channel assignment permutation; and
initiate, during third beacon intervals, third ranging measurements between the plurality of APs based on the first channel assignment permutation to generate a third ranging result;
wherein resolving the locations of the plurality of APs is based on the third ranging result.

14. The computing device of claim 11, wherein the instructions comprise instructions to:
based on a determination that the total ranging measurements are not performed for at least the threshold percentage of the available links between the APs on the plurality of channels:
select the second channel assignment permutation among a set of available channel assignment permutations; and
configure the plurality of APs with the second channel assignment permutation based on availability information of the plurality of APs.

15. The computing device of claim 11, wherein the availability information of the plurality of APs is based on a time of day that corresponds to an operating state of the plurality of APs, a signal quality measurement between the plurality of APs, a client load for the plurality of APs, or a combination thereof.

16. The computing device of claim 15, wherein the availability information of the plurality of APs is independent of a channel assignment plan for the plurality of APs.

17. An article comprising at least one non-transitory machine-readable storage medium comprising instructions executable by at least one processing resource to:
assign, by a computing device, a plurality of channels to a plurality of network devices based on a first channel assignment permutation;
initiate, by the computing device during first beacon intervals, first ranging measurements between the plurality of network devices on the plurality of channels based on the first channel assignment permutation to generate a first ranging result;
determine, by the computing device, that total ranging measurements are not performed for a threshold percentage of available links between the plurality of network devices on the plurality of channels, wherein the total ranging measurements include the first ranging measurements;
assign, by the computing device, the plurality of channels to the plurality of network devices based on a second channel assignment permutation; and
initiate, by the computing device during second beacon intervals, second ranging measurements between the plurality of network devices on the plurality of channels based on the second channel assignment permutation to generate a second ranging result; and resolve, by the computing device, locations of the plurality of network devices based on the first ranging result and the second ranging result.

18. The article of claim 17, wherein the instructions to initiate the first ranging measurements between the plurality of network devices on the plurality of channels based on the first channel assignment permutation comprise instructions to:

for each pair of network devices of the plurality of network devices:
initiate ranging measurements between a first network device of the pair of network devices and a second network device of the pair of network devices on a first channel assigned to the first network device based on the first channel assignment permutation; and
initiate ranging measurements between the first network device and the second network device on a second channel assigned to the second network device based on the first channel assignment permutation.

19. The article of claim 17, wherein the instructions comprise instructions to:

determine that the total ranging measurements are not performed for a second threshold percentage of available links based on the first channel assignment permutation; and initiate, during third beacon intervals, third ranging measurements between the plurality of network devices based on the first channel assignment permutation to generate a third ranging result;

wherein resolving the locations of the plurality of network devices is based on the third ranging result.

20. The article of claim 17, wherein the instructions comprise instructions to:

based on a determination that the total ranging measurements are not performed for at least the threshold percentage of the available links between the network devices on the plurality of channels:
select the second channel assignment permutation among a set of available channel assignment permutations; and
configure the plurality of network devices with the second channel assignment permutation based on availability information of the plurality of network devices.

* * * * *